United States Patent [19]
Havranek

[11] 3,718,212
[45] Feb. 27, 1973

[54] PHASED ROLLER CLUTCH

[75] Inventor: John E. Havranek, Schaumburg, Ill.

[73] Assignee: Borg-Warner Corporation, Chicago, Ill.

[22] Filed: Dec. 1, 1971

[21] Appl. No.: 203,601

[52] U.S. Cl. ................................................192/45
[51] Int. Cl. ...........................................F16d 41/06
[58] Field of Search....................192/38, 44, 45, 27

[56] References Cited

UNITED STATES PATENTS

| | | | |
|---|---|---|---|
| 2,203,805 | 6/1940 | Wiggs | 192/45 |
| 2,204,768 | 6/1940 | Peck | 192/45 |
| 2,332,061 | 10/1943 | Conkle | 192/45 X |
| 2,705,552 | 4/1955 | Cross et al. | 192/45 |
| 2,998,113 | 8/1961 | Marland | 192/45 |
| 3,011,606 | 12/1961 | Ferris et al. | 192/45 |
| 3,104,744 | 9/1963 | Wade | 192/45 |
| 3,256,751 | 6/1966 | Tuck et al. | 192/45 |

*Primary Examiner*—Allan D. Herrmann
*Attorney*—Herman E. Smith et al.

[57] ABSTRACT

A phased roller clutch for providing an overrunning coupling between a cammed race and a smooth race is provided with a split ring energizing spring so constructed and arranged that one end of the spring is wedged between the cage and the cammed race during overrunning operation of the clutch to prevent displacement with respect to the cammed race. A clutch consisting of cage, rollers and energizing spring can be preassembled as a unitary assembly for insertion between a pair of races without requiring that the spring end be separately connected to the cammed race. Integral means is provided for centering the clutch assembly on the cammed race, and means is provided for preventing axial displacement of the spring from the roller assembly.

10 Claims, 8 Drawing Figures

PATENTED FEB 27 1973　　　　　　　　　　　　　　　　3,718,212

PHASED ROLLER CLUTCH

SUMMARY OF THE INVENTION

The present invention relates generally to overrunning clutches of the phased roller type and more particularly to a roller assembly having an energizing spring arranged for wedging engagement with a cammed race.

One way engaging devices of the phased roller type employ a cage having a plurality of circumferentially spaced windows or apertures through which wedging rollers extend. The spaced apertures maintain a predetermined angular relationship between the rollers such that the cage and each of the rollers oscillate uniformly cage simultaneously as a unit. A CAGE and roller assembly is installed between one race having a plurality of wedging cam surfaces thereon and a second race having a smooth circular surface. Relative arcuate movement between the cage and cammed race in one direction causes the rollers to move uniformly into wedging engagement between the two races to effect a driving connection therebetween, while relative arcuate movement between the cage and cammed race in the opposite direction releases the races for overrunning with respect to each other. An energizing spring is employed to bias the roller and cage assembly in the said one direction with the result that the driving or overrunning mode of operation is automatically determined by the direction of relative rotation of the races.

According to past practice, the energizing spring has one end attached to the cage while its other end is secured to the cammed race or to a collar member which is also secured to the cammed race. Where the spring is fastened directly to the cammed race, difficulties are encountered in providing a secure connection sufficient to prevent circumferential displacement of the spring end with respect to the cam surfaces of the cammed race. In order to overcome this problem the cammed race has been provided with elongated slots, or inclined holes, or binding posts for securing the spring end against displacement with respect to the cammed race. These prior solutions are objectionable in that tedious work is often required to connect the spring to the cammed race or because the cammed race must be slotted, drilled or otherwise adapted to form a portion of the connection.

Where the spring is fastened to a collar member which is secured to the cammed race, some of the above objections are overcome inasmuch as the slotting, drilling or other special preparation of the cammed race can be avoided. However, it is necessary to produce an additional part and to effect a secure connection of the spring to the collar.

According to the present invention a split ring energizing spring is provided having a radially projecting end portion adapted to slide axially into one of the existing wedging cam surfaces of the cammed race, the radially projecting portion becoming wedged between a portion of the cage and a cam surface during overrunning operation of the clutch to prevent separation of the end of the spring from the cammed race.

A principal object of the present invention is to provide an improved split ring energizing spring for a roller clutch assembly, another object is to provide integral locating means for centering a roller assembly concentrically about a cammed race, an additional object of the invention is to provide a preassembled roller clutch and energizing spring assembly for axial installation with a cammed race in which a portion of the cage and one of the the cam surfaces provide means for securing one end of the spring against circumferential displacement with respect to the cammed race, a further object of the invention is to provide means for retaining the energizing spring against axial displacement from the roller and cage assembly. Other objects and advantages of the invention will become apparent to those skilled in the art from consideration of the following description together with the drawing.

DESCRIPTION OF THE PREFERRED EMBODIMENTS

Figure 1:
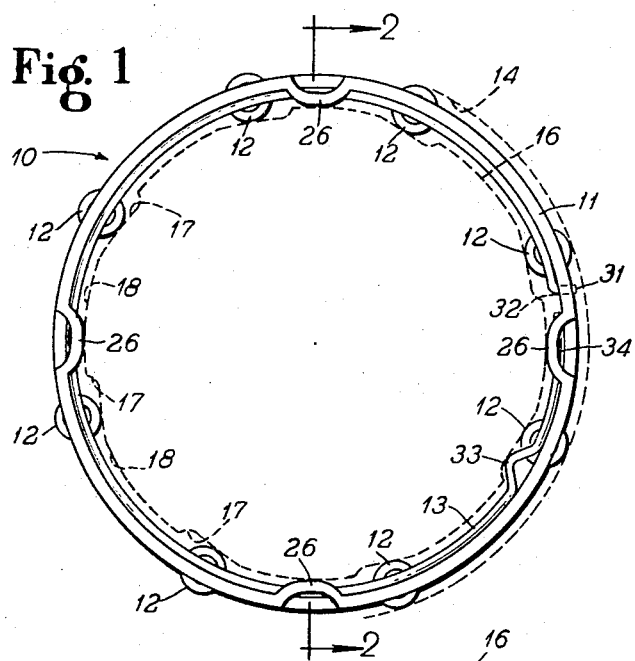
FIG. 1 is a plan view of a roller clutch assembly according to the present invention.

Referring now in more detail to the drawing the reference character 10 generally indicates a phased one-way overrunning roller clutch according to the present invention including a cage 11, a plurality of roller wedging elements 12, and a split ring energizing spring 13. The clutch assembly provides an overrunning coupling between a pair of concentric races indicated as the smooth race 14 and the cammed race 16.

The cammed race 16 is provided with a plurality of circumferentially spaced wedge cam surfaces 17 having circular arc portions 18 therebetween. The outer race 14 has a smooth continuous arcuate surface coaxial with race 16 and substantially concentric with the arc portions 18.

Figure 8:
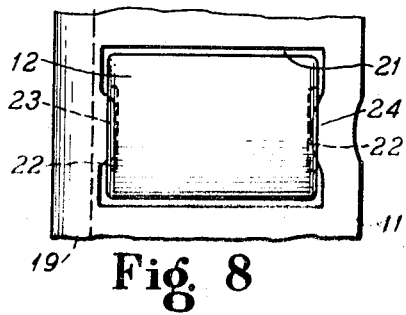
FIG. 8 is an enlarged fragmentary view showing a roller and cage in greater detail.

The cage 11 is shown as a sheet metal annulus having an inwardly directed radial flange portion 19. A plurality of window-like substantially rectangular apertures 21 are provided in the cage for receiving respective rollers 12. In a preferred form, the rollers 12 are provided with cavities 22 in opposite end faces thereof which are engaged by a tang portion 23 and an integral deformed portion 24 of the cage for loosely retaining the rollers in assembly as shown more clearly in FIG. 8.

Figure 2:
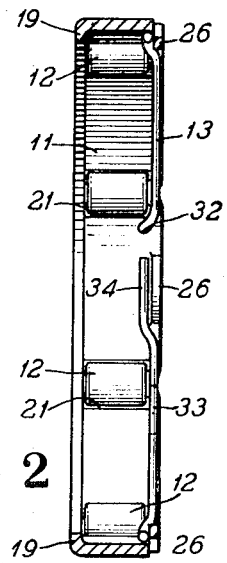
FIG. 2 is a section view taken along the line 2—2 of FIG. 1.
Figure 5:
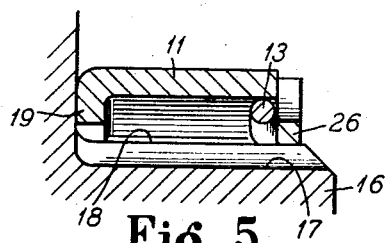
FIG. 5 is an enlarged section view showing a preferred form of integral locating means for the roller clutch assembly.

The cage 11 is preferably provided with integral rib-like protuberant sheared portions such as 26, 27, 28 or a combination thereof, each rib portion being located circumferentially between a pair of apertures 21. In the form shown in FIGS. 1, 2, and 5, the rib-like projections 26 extend circumferentially and project radially inwardly for slidable engagement with respective circular arc portions 18 of the cammed race 16. The rib-like projections provide locating means for maintaining the roller clutch assembly concentric with the cammed race 16 while permitting oscillation with respect thereto. A further advantage of the rib-like portions 26 is illustrated in FIGS. 1 and 2 where it is shown that the energizing spring 13 is retained against axial displacement by the ends of a pair of adjacent rollers 12, 12 and a rib 26 spaced therebetween.

Figure 6:
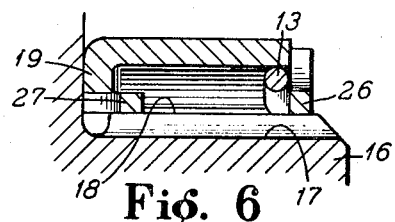
FIGS. 6 and 7 are views similar to FIG. 5 showing alternate forms of locating means.
Figure 7:
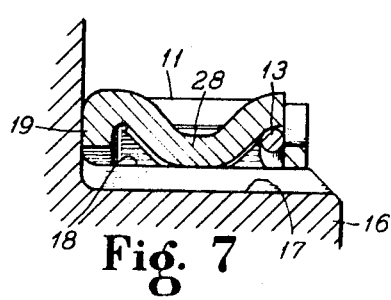

A modified form of cage locating means is shown in FIG. 6 wherein a sheared rib-like portion 27 similar to rib 26 extends circumferentially but projects axially inwardly of the cage being sheared from the radial flange portion 19. If desired, different forms of ribs may be employed in combination, for example, it may be desirable to provide at least one rib 26 for retaining the energizing spring 13 in combination with one or more ribs 27. While a pair of ribs 26, 27 are shown in a common plane for convenience of illustration in FIG. 6, they may be angularly spaced, if desired. A further modified form of locating means is shown in FIG. 7 wherein the rib-like projection 28 extends axially and projects radially inwardly, being sheared from the annular portion of cage 11. It may be desirable to provide at least one rib 26 for loosely retaining the energizing spring 13 against axial displacement.

Energizing spring 13 includes a radially outwardly extending hook portion 31 extending through an aperture 32 in cage member 11 for securing a first end portion of the spring to the cage. The spring is generally in the form of a split ring extending circularly within cage 11 and terminating in a second end portion. Spring 13 may be formed of wire having either circular or rectangular cross section, the circular form being shown in the drawing.

Figure 3:
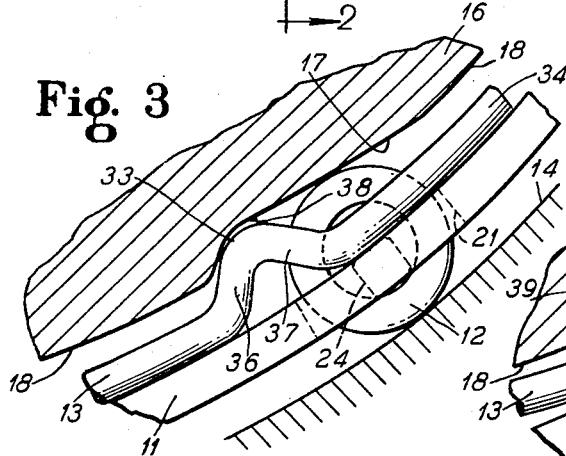
FIG. 3 is an enlarged fragmentary view of the clutch assembly of FIG. 1 showing an end portion of the energizing spring when the clutch is in driving condition.
Figure 4:
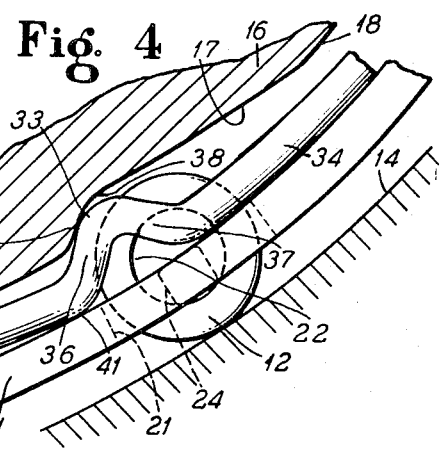
FIG. 4 is a view similar to FIG. 3 showing flexure of the energizing spring under load when the clutch assembly is in overrunning condition.

In a preferred form, the second end portion of spring 13 includes an inwardly extending nose-like bight portion 33 adjacent a circumferentially extending finger portion 34. The nose portion 33 is formed by a first inwardly bent leg portion 36 followed by an outwardly bent second leg portion 37. Referring to FIGS. 3 and 4, the proportions of first leg portion 36 are selected to extend between the inner surface of cage 11 and the shallow portion 38 of a cam surface 17 giving attention to the requirement for dimensional clearances to permit sliding the roller cage and spring assembly axially onto the cammed race 16.

In the drive condition shown in FIG. 3, the spring 13 rests against the inner surface of cage 11 while the nose portion 33 is loosely received in the shallow portion 38 of cam surface 17. In the overrunning condition (see FIG. 4) oscillation of cage 11 exerts a circumferential pull on spring 13 causing it to assume a slightly smaller diameter between the hook portion 31 and nose portion 33. The circumferential pull on spring 13 during overrunning causes leg portion 36 to bind or wedge itself between a portion of the cage and a portion of the cam surface as indicated at 39 and 41 thereby preventing circumferential displacement of the second end of the spring with respect to the cam surface of the cammed race. While an appropriately proportioned first leg portion 36 is sufficient for securing the second end of the spring against circumferential displacement with respect to the cam surface, it is preferred to provide the second leg portion 37 and finger portion 34.

The second leg portion 37 may be employed to provide increased rigidity for nose portion 33 and first leg portion 36 where it is desired to minimize deflection of leg portion 36, as for example, where a smaller wire size is used for spring 13 or the depth of cam surface 17 is very small.

A further advantage of second leg 37 and finger portion 34 is that radially outward components of force exerted on first leg portion 36 at the point of contact 39 with the inner race 16 are transferred to the cage by the finger portion 34 as well as at the point 41. It is desirable to position finger portion 34 such that it lies beneath one of the rib portions 26 for axial retention of spring 13 and is diametrically opposite another one of the rib portions 26, 27 or 28 for urging the other rib portion into guiding engagement with a respective arc portion 18.

It is to be noted that the above described arrangement of nose portion 33, particularly first leg portion 36 thereof, overcomes the problem of prior devices which required that the second end portion of the energizing spring be fastened to the cammed race by means of special slots, holes or binding posts.

The improved roller clutch assembly according to the foregoing description has special utility in that the cage and energizing spring are pre-assembled such that axial insertion of the assembly between a pair of races provides a phased overrunning clutch apparatus concentrically aligned with the cammed race and biased for oscillation with respect thereto.

What is claimed is:

1. A one-way engaging device for providing an overrunning coupling between a pair of races, said device being adapted for oscillation relative to one of said races having spaced cam means defined therein comprising: a plurality of roller wedging elements; a cage including a plurality of apertures through which respective roller wedging elements extend; and a split ring energizing spring having a first portion thereof secured to said cage and having a second portion thereof defining reaction means, said second portion including an integral projection extending away from said cage adapted for wedging engagement between said cage and a cam surface of one of said cam means defined in said one race.

2. A one-way engaging device according to claim 1 in which said energizing spring projection is provided by a nose portion formed in a bight of said spring for engagement with said cam surface defined in said one race.

3. A one-way engaging device according to claim 1 in which said energizing spring projection is provided by a nose portion formed in a bight portion of said spring adjacent a finger portion defining the extremity of said second end portion of said spring.

4. A one-way engaging device according to claim 1 in which said cage includes locating means disposed between said apertures having a portion thereof adapted for engagement with said one race between spaced cam means defined therein.

5. A one-way engaging device according to claim 4 in which said cage includes an annular member having a radial thickness less than the diameter of a roller and an axial length greater than the length of a roller, said locating means being provided by projections formed integrally with said annular member.

6. A one-way engaging device according to claim 5 in which said annular member is formed of sheet metal having said apertures spaced circumferentially therein, said locating means being provided by rib-like portions sheared from said annular member located circumferentially between a pair of apertures.

7. A one-way engaging device according to claim 6 in which said rib-like portions extend generally axially of said annular member defining radial protuberances between the axial ends of said annular member adapted for engagement with said one race between spaced cam means defined therein.

8. A one-way engaging device according to claim 6 in which said rib-like portions extend generally circumferentially of said annular member defining radial protuberances adjacent an axial end of said annular member adapted for engagement with said one race between spaced cam means defined therein.

9. A one-way engaging device according to claim 6 in which said annular member includes a radial flange defining one axial end thereof, said rib-like portions being sheared from said flange and extending axially inwardly of said cage.

10. A one-way engaging device according to claim 1 in which said energizing spring extends between the ends of a pair of adjacent rollers and a rib-like projection sheared from said cage between said pair of rollers for loosely retaining said energizing spring against axial displacement from said cage.

* * * * *